(12) United States Patent
Du et al.

(10) Patent No.: US 11,525,949 B2
(45) Date of Patent: Dec. 13, 2022

(54) DEVICE OPTICAL WINDOW CAMOUFLAGE

(71) Applicant: 3M INNOVATIVE PROPERTIES COMPANY, St. Paul, MN (US)

(72) Inventors: Guanglei Du, Painted Post, NY (US); John A. Wheatley, Stillwater, MN (US); Yihang Lv, Shanghai (CN); Zhiyong Xu, Shanghai (CN); Jingfei Chen, Shanghai (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 169 days.

(21) Appl. No.: 16/341,709

(22) PCT Filed: Oct. 20, 2016

(86) PCT No.: PCT/CN2016/102716
§ 371 (c)(1),
(2) Date: Apr. 12, 2019

(87) PCT Pub. No.: WO2018/072176
PCT Pub. Date: Apr. 26, 2018

(65) Prior Publication Data
US 2019/0293849 A1    Sep. 26, 2019

(51) Int. Cl.
*G02B 5/22*       (2006.01)
*G01N 21/15*      (2006.01)
(Continued)

(52) U.S. Cl.
CPC ............. *G02B 5/223* (2013.01); *G01N 21/15* (2013.01); *G02B 5/005* (2013.01); *G02B 5/22* (2013.01); *G01N 21/17* (2013.01)

(58) Field of Classification Search
CPC ........ G02B 5/005; G02B 5/006; G02B 5/223; G03B 23/16; G03B 9/02; H04N 5/23212; G06F 3/044
(Continued)

(56) References Cited

U.S. PATENT DOCUMENTS 5,956,122 A     9/1999  Doster
9,465,142 B2 * 10/2016  Muro ................ H01L 27/14618
(Continued)

FOREIGN PATENT DOCUMENTS

CN    2563676     7/2003
CN    203733133   7/2014
(Continued)

OTHER PUBLICATIONS

Leaflet of Tokai Kogaku's Product (White IR Transmissive Film) https://www.tokaioptical.com/product/tokai_color_white_ir_window.pdf.
(Continued)

*Primary Examiner* — Audrey Y Chang
(74) *Attorney, Agent, or Firm* — Clifton F. Richardson

(57) ABSTRACT

An example article may include an optical filter and a multilayer stack adjacent the optical filter. The multilayer stack may include a plurality of layers. Each respective layer of the plurality layers may define a respective window edge of a plurality of window edges. The plurality of window edges may define an optical window configured to transmit light through the optical filter. At least a first respective window edge of the plurality of window edges may be stepped relative to at least a second respective window edge of the plurality of window edges.

24 Claims, 7 Drawing Sheets

(51) Int. Cl.
*G02B 5/00* (2006.01)
*G01N 21/17* (2006.01)

(58) Field of Classification Search
USPC .............. 359/896, 885, 887, 888; 348/373
See application file for complete search history.

(56) References Cited

U.S. PATENT DOCUMENTS

| | | | |
|---|---|---|---|
| 9,640,681 B2* | 5/2017 | Min | ............... H01L 31/0232 |
| 9,848,118 B2* | 12/2017 | Ollila | ................ H04N 5/23212 |
| 2002/0005524 A1 | 1/2002 | Kato | |
| 2005/0180015 A1 | 12/2005 | Aisenbrey | |
| 2006/0145056 A1* | 7/2006 | Jung | ................ H01L 27/14685 |
| | | | 250/208.1 |
| 2008/0316594 A1 | 12/2008 | Hashiguchi | |
| 2009/0116132 A1* | 5/2009 | Hiwatashi | .......... C08G 18/7642 |
| | | | 359/885 |
| 2012/0098551 A1 | 4/2012 | Tsukamoto | |
| 2013/0058128 A1 | 3/2013 | Cho | |
| 2013/0087194 A1 | 4/2013 | Jang | |
| 2014/0062912 A1 | 3/2014 | Lien | |
| 2014/0118826 A1* | 5/2014 | Jiao | ......................... G02B 5/30 |
| | | | 359/491.01 |
| 2014/0286019 A1 | 9/2014 | Araki | |
| 2015/0070794 A1 | 3/2015 | Wu | |
| 2015/0202848 A1 | 7/2015 | Cho | |
| 2016/0011348 A1 | 1/2016 | Hirakoso | |
| 2017/0124392 A1 | 5/2017 | Gu | |
| 2017/0318239 A1* | 11/2017 | Miyasaka | ............. G02B 5/281 |
| 2017/0372123 A1* | 12/2017 | Kim | ........................ G06F 3/044 |
| 2018/0004044 A1 | 1/2018 | Nolan | |
| 2019/0123218 A1 | 4/2019 | Min | |

FOREIGN PATENT DOCUMENTS

| | | |
|---|---|---|
| CN | 104573667 | 4/2015 |
| CN | 204442500 | 7/2015 |
| CN | 105182603 | 12/2015 |
| JP | 4122010 | 4/1999 |
| JP | 2005-283855 | 10/2005 |
| JP | 2013-65052 | 4/2013 |
| WO | WO 2014-178276 | 11/2014 |

OTHER PUBLICATIONS

International Search Report for PCT International Application No. PCT/CN2016/102716, dated Jul. 25, 2017, 4 pages.

* cited by examiner

DEVICE OPTICAL WINDOW CAMOUFLAGE

CROSS REFERENCE TO RELATED APPLICATIONS

This application is a national stage filing under 35 U.S.C. 371 of PCT/CN2016/102716, filed Oct. 20, 2016, the disclosure of which is incorporated by reference in its/their entirety herein.

BACKGROUND

Devices may include optical filters in a wide variety of applications such as optical communication systems, sensors, imaging, scientific and industrial optical equipment, and display systems. Optical filters may include optical layers that manage the transmission of incident electromagnetic radiation, including light. Optical filters may reflect or absorb a portion of incident light, and transmit another portion of incident light through an optical window. Optical layers within an optical filter may differ in wavelength selectivity, optical transmittance, optical clarity, optical haze, and index of refraction.

SUMMARY

The disclosure describes an example article that includes an optical filter and a multilayer stack adjacent the optical filter. The multilayer stack may include a plurality of layers. Each respective layer of the plurality layers may define a respective window edge of a plurality of window edges. The plurality of window edges may define an optical window configured to transmit light through the optical filter. At least a first respective window edge of the plurality of window edges may be stepped relative to at least a second respective window edge of the plurality of window edges.

The disclosure describes an example article that includes an optical filter and multilayer stack. The multilayer stack may include a plurality of layers arranged from a lowermost layer to an uppermost layer. Each respective upper layer in the multilayer stack may defines a respective upper window edge that extends radially inward from a respective lower window edge defined by a respective lower layer of the plurality of layers.

The disclosure describes an example article that includes an optical filter and a multilayer stack adjacent the optical filter. The multilayer stack may include a plurality of layers. Each respective layer of the plurality layers may define a respective window edge of a plurality of window edges. The plurality of window edges may define an optical window configured to transmit light through the optical filter. The example article may include a color layer. The multilayer stack may be disposed between the color layer and the optical filter. The color layer may extend across the optical window.

The disclosure describes an example article that includes an optical filter and a multilayer stack adjacent the optical filter. The multilayer stack may include a plurality of layers. Each respective layer of the plurality layers may define a respective window edge of a plurality of window edges. The plurality of window edges may define an optical window configured to transmit light through the optical filter. The example article may include a texture layer. The multilayer stack may be disposed between the texture layer and the optical filter. The texture layer may extend across the optical window.

The disclosure describes an example technique. The example technique may include forming a respective window edge of a plurality of window edges in each respective layer of a plurality of layers. The example technique may include arranging the plurality of layers from a lowermost layer to an uppermost layer to form a multilayer stack. Each respective upper layer in the multilayer stack may define a respective upper window edge that extends radially inward from a respective lower window edge defined by a respective lower layer of the plurality of layers. The example technique may include disposing an optical filter adjacent the lowermost layer.

The details of one or more aspects of the invention are set forth in the accompanying drawings and the description below. Other features, objects, and advantages of the invention will be apparent from the description and drawings, and from the claims.

BRIEF DESCRIPTION OF DRAWINGS

The foregoing and other aspects of this invention are made more evident in the following Detailed Description, when read in conjunction with the attached Figures.

It should be understood that features of certain Figures of this disclosure may not necessarily be drawn to scale, and that the Figures present non-exclusive examples of the techniques disclosed herein.

DETAILED DESCRIPTION

Figure 1:
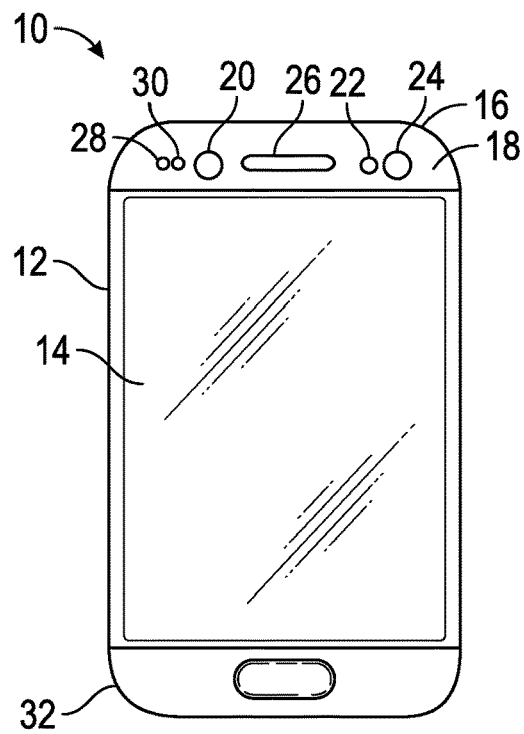
FIG. 1 is a conceptual and schematic diagram of an example article including an optical window.

FIG. 1 is a conceptual and schematic diagram of an example article including an optical window. An example article 10 may include a personal electronic device, for example, a cellphone including a body 12 having a display 14. In some examples, an electronic or mechanical system may include example article 10, for example, any system that may include a display. For example, the system may include a car, an appliance, furniture, or other component that includes a body and a display including a touchscreen region and a sensor panel. As shown in FIG. 1, article 10 may include a sensor panel 16 adjacent display 14. Sensor panel 16 may have a surface 18. Sensor panel 16 may include an optical window 20. Optical window 20 may be disposed adjacent other optional optical windows, for example, proximity sensor window 28, ambient sensor window 30, infrared LED (light emitting diode) window 22, camera window 24. In some examples, the optical windows of sensor panel 16, for example, optical window 20, may allow light to be transmitted to a respective light receiver or a light transmitter beneath surface 18 of sensor panel 16. For example, the light receiver may include a visible, infrared, polarized, or other light sensor, and the light transmitter may include a visible, infrared, polarized, or other light transmitter. In some examples, the light receiver or transmitter may be a broadband or narrowband device, respectively configured to emit or sense a predetermined wavelength band of light, for example, one or more of visible, infrared, or ultraviolet wavelengths. Infrared wavelengths may include wavelengths from about 700 nm to about 2000 nm. In some examples, article 10 may include proximity sensor window 28 disposed adjacent or optically coupled to a proximity sensor underneath sensor panel 16. The proximity sensor may emit an infrared or other suitable signal through proximity sensor window 28 and receive a return signal bounced or reflected from an object through proximity sensor window 28. In some examples, article 10 may include ambient sensor window 30 disposed adjacent a photodiode or other light sensor underneath sensor panel 16, that may sense ambient light transmitted through ambient sensor window 30. In some examples, article 10 may include infrared LED window 22 disposed adjacent an infrared LED source disposed underneath sensor panel 16, that may transmit an infrared beam through infrared LED window 22. In some examples, article 10 may include camera window 24 disposed adjacent a CCD (charge coupled device), CMOS, or other light sensor array capable of photographing a visible or infrared image transmitted through camera window 24. In some examples, article 10 may include only one optical window, or more than one optical window, of the example optical windows described above. In some examples, article 10 may include other optical windows that transmit light across the respective optical window to or from the surrounding environment. In some examples, one or more optical windows may include or be disposed adjacent optical elements such as mirrors, reflectors, lenses, optical filters, or other optical elements for enhancing, directing, or selecting characteristics of light transmitted through the respective optical windows. For example, optical filters may change the polarization or change the spectrum of light. In some examples, optical filters may act as a polarizer (one or both of absorptive or reflective polarizer) for predetermined wavelengths. In some examples, article 10 may include a second sensor panel 32 that may include other optical windows or sensors (not shown). In some examples, sensor panel 16 may include an audio component 26 adjacent optical window 20. For example, audio component 26 may include a speaker or a microphone.

Figure 2A:
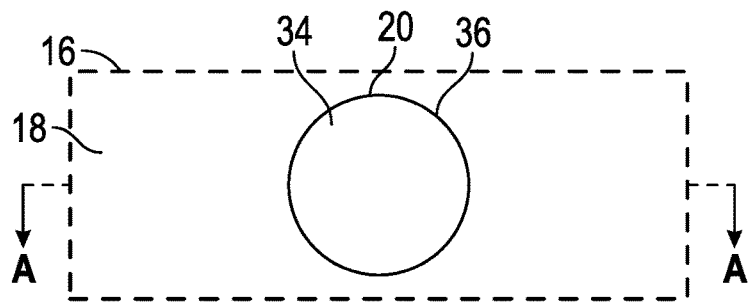
FIG. 2A is a conceptual and schematic diagram of an example optical window of the example article of FIG. 1.
Figure 2B:
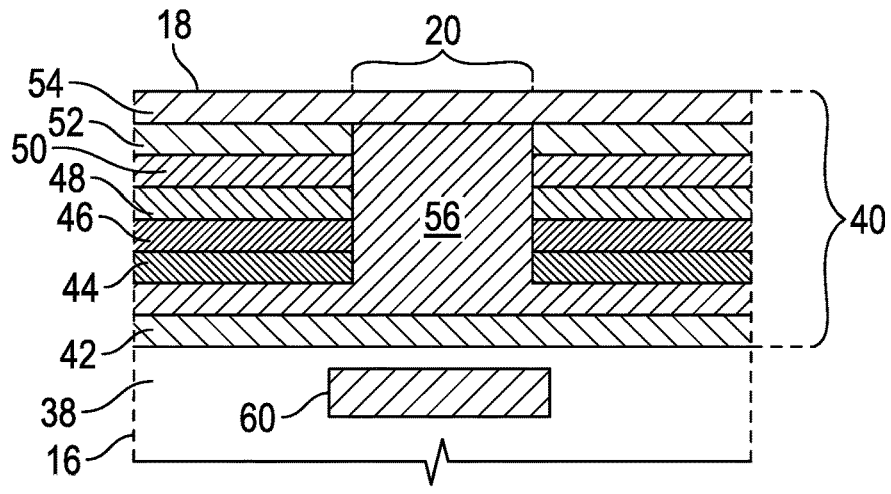
FIG. 2B is a cross-sectional diagram along section A-A of the example optical window of FIG. 2A.

FIG. 2A is a conceptual and schematic diagram of an example optical window of the example article of FIG. 1. In some examples, optical window 20 may define an edge 36 surrounding a region 34 observable through optical window 20. For example, region 34 may exhibit a different in color, texture, reflectance, or other optical property with respect to surrounding surface 18, such that the difference leads to a visible perception of either region 34 as a whole in surface 18 of sensor panel 16, or a visible perception of edge 36 separating region 34 from surface 18, or both. FIG. 2B is a cross-sectional diagram along section A-A of the example optical window of FIG. 2A. In some examples, article 10 may include a multilayer stack 40 that defines optical window 20. In some examples, article 10 may include a light receiver or transmitter 60 adjacent multilayer stack 40. For example, light receiver or transmitter 60 may include a light sensor such as an infrared sensor, or a light emitter such as an infrared LED, or any other suitable sensor or emitter described above. In some examples, an optical filter 42 may be disposed between optical window 20 and light receiver or transmitter 60. For example, optical filter 42 may transmit a first predetermined set of wavelengths, while scattering or reflecting a second predetermined set of wavelengths. In some examples, an optically clear adhesive 56 may occupy optical window 20 defined by multilayer stack 40, or another predetermined volume adjacent optical window 20. In some examples, multilayer stack may include a protective layer 54 that is an outermost layer, for example, a layer that defines surface 18. For example, protective layer 54 may include one or more of glass, metal, ceramic, polymeric or other materials that act as a physical barrier to transmission of shock or dust to the interior of body 12 of article 10. In some examples, multilayer stack 40 may not include protective layer 54, and instead, protective layer 54 may be adjacent a major surface of the multilayer stack. For example, protective layer 54 may be adjacent a major surface away from optical filter 42.

In some examples, multilayer stack 40 may include one or more layers that define optical window 20. In some examples, one or more layers of multilayer stack 40 may include one or more of glass, polymer, ceramic, non-woven fabric, metal or any other suitable material. For example, multilayer stack 40 may include one or more of a first absorbing layer 44, a second absorbing layer 46, a first colored layer 48, a second colored layer 50, a third colored layer 52. In some examples, one or both of first absorbing layer 44 or second absorbing layer 46 may include an absorbing dye or pigment that absorbs predetermined wavelengths or wavelength bands. For example, first absorbing layer 44 or second absorbing layer 46 may substantially absorb all visible wavelengths, and appear substantially black. In some examples, one or both of first absorbing layer 44 or second absorbing layer 46 may include a grey pigment, or otherwise appear grey. In some examples, one or both of first absorbing layer 44 or second absorbing layer 46 may be tinted with a predetermined color. In some examples, one or more of first colored layer 48, second colored layer 50, or third colored layer 52 may include a dye or pigment that absorbs predetermined wavelengths or wavelength bands, and may reflect or scatter other predetermined wavelengths or wavelength bands. For example, first colored layer 48, second colored layer 46, or third colored layer 52 may substantially scatter all visible wavelengths, and appear substantially white. In some examples, one or more of first colored layer 48, second colored layer 46, or third colored layer 52 may include a white dye or pigment. In some examples, first colored layer 48, second colored layer 46, or third colored layer 52 may include dispersive particles, for example, titanium dioxide or other suitable dispersive particles. Thus, in some examples, at least one layer of the plurality of layers may substantially scatter visible light, and at least another layer of the plurality of layers may substantially absorb visible light. For example, at least the uppermost layer of the plurality of layers may substantially scatter visible light, and at least the lowermost layer of the plurality of layers may substantially absorb visible light. In some examples, the at least one layer may include one or more of a white ink, pigment, or dye, and the at least another layer may include one or more of a black ink, pigment, or dye. For example, at least the uppermost layer may include one or more of a white ink, pigment, or dye, and at least the lowermost layer may include one or more of a black ink, pigment, or dye. In some examples, one or more layers of multilayer stack 40 may include a white ink, for example, SS8-61 (hangmen TOYO Ink Co., Ltd., Guangdong, China). In some examples, one or more layers of multilayer stack 40 may include a black ink, for example, IR9508 (MingBo Anti-Forgery Technology (Shenzhen) Co., Ltd., Guangdong, China). In some examples, an adhesive, for example, one or more of a pressure-sensitive adhesive, a hot melt adhesive, a two-part adhesive, or a UV-cured adhesive may be disposed between one or more layers of multilayer stack 40. In some examples, multilayer stack 40 may include one or more scattering layers, colored layer, tinted layers, hazy layers, clear layers, or wavelength selective layers. All the layers described above are optional, and in some examples, multilayer stack 40 may include none, one, or more than one layers described above, or may include additional layers.

In some examples, one or more of first absorbing layer 44, second absorbing layer 46, first colored layer 48, second colored layer 50, or third colored layer 52 may have any predetermined visible color, for example, by scattering, diffusing, or reflecting predetermined visible wavelengths. In some examples, one or more of first absorbing layer 44, second absorbing layer 46, first colored layer 48, second colored layer 50, or third colored layer 52 may at least partially absorb, refract, reflect, or diffuse infrared wavelengths. In some examples, one or more of first absorbing layer 44, second absorbing layer 46, first colored layer 48, second colored layer 50, or third colored layer 52 may exhibit a visible color geometric pattern that is substantially similar to or substantially coincides with an infrared absorbing geometric pattern. In some examples, one or more of first absorbing layer 44, second absorbing layer 46, first colored layer 48, second colored layer 50, or third colored layer 52 may exhibit a visible color geometric pattern that is at least partially different from an infrared absorbing geometric pattern exhibited by the respective layer.

In some examples, third colored layer 52 may be disposed on second colored layer 50 which may be disposed on first colored layer 48 which may be disposed on second absorbing layer 46 which may be disposed on first absorbing layer 44, as shown in FIG. 2B. For example, third colored layer 52 may be an uppermost layer closest to surface 18, and first absorbing layer 44 may be a lowermost layer farthest from surface 18 and closest to light receiver or emitter 60. In some examples, a diffractive optical layer may be disposed adjacent one or more of first colored layer 48, second colored layer 50, or third colored layer 52. For example, the diffractive optical layer may be disposed between second colored layer 50 and third colored layer 52. In some examples, the diffractive layer may be microstructured, for example, with nano- or micron-sized features, and may exhibit a varying refractive index. In some examples, one or more layers of multilayer stack 40 may define window edges, such that the window edges together define optical window 20.

For example, respective edges of first absorbing layer 44, second absorbing layer 46, first colored layer 48, second colored layer 50, and third colored layer 52 may define optical window 20. In some examples, the respective edges may be aligned, as shown in FIG. 2B, such that the aligned edges are visible as a relatively sharp edge 36, as shown in FIG. 2A. In some examples, region 34 observable through optical window 20 may include a major surface of optical filter 42, a major surface of light receiver or emitter 60, or any other surface beneath multilayer stack 40, for example, a major surface of a component in body 12 of article 10. In some examples, an edge of optical window 20 may be defined by a straight or a curved interface line. For example, optical window 20 may define two adjacent regions on a major surface, such that an optical property transitions from a first region to a second region. In some examples, region 34 may therefore exhibit a visibly different texture, appearance, color or optical property compared to surface 18 of sensor panel 16.

However, in some examples, camouflaging or otherwise concealing one or more of optical window 20, edge 36, or region 34 from a visible perception may be preferred. For example, the perception of optical window 20, edge 36, or region 34 may detract from an aesthetic quality, intended design considerations, or target user interaction of article 10 as a whole or sensor panel 16 in particular. In some examples, a uniform visible appearance of sensor panel 16 may be preferred. However, the aligned edges of layers in multilayer stack 40 may prevent the preferred uniform appearance by resulting in a visible transition between surface 18 and region 34.

Figure 3A:
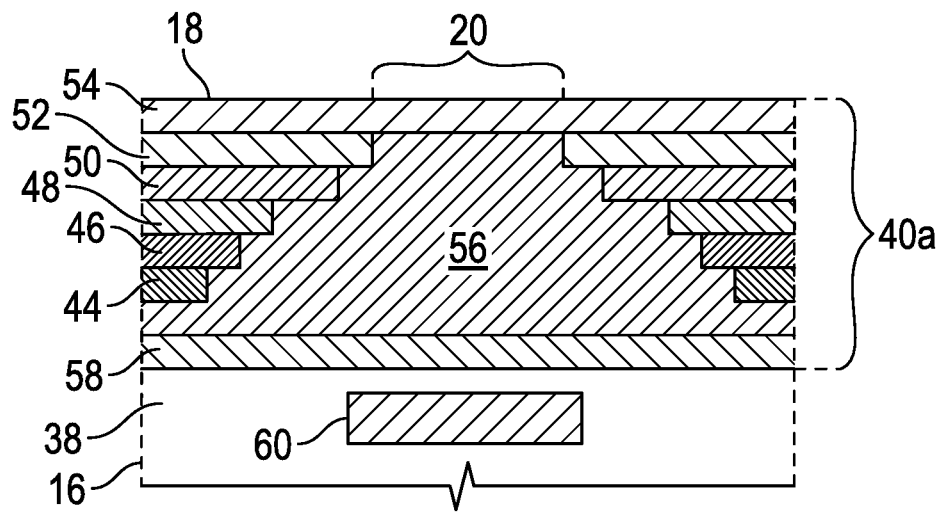
FIG. 3A is a cross-sectional diagram of an example article including an example optical window having stepped edges.

In some examples, respective layers of multilayer stack 40 may be stepped, to provide a gradual transition between the perception of surrounding area 18 and region 34, such that surface 18 of sensor panel 16 appears to have a more uniform appearance. For example, FIG. 3A is a cross-sectional diagram of an example article including an example optical window having stepped edges, and an optical filter 58. In some examples, optical filter 58 may be similar to optical filter 42 described with reference to example articles above. In some examples, a partial region or a major surface of optical filter 58 may be coated with an NIR transparent visibly opaque or black ink. In some examples, optical filter 58 may include a wavelength selective scattering filter having a predetermined infrared transmittance and a predetermined visible scattering ratio. For example, optical filter 58 may be configured to camouflage the light emitter or receiver from a visible perception. However, optical filter 58 may not be sufficient to mask or camouflage or mask aligned window edges from a visible perception.

Thus in some examples, multilayer stack 40 may include a plurality of layers, for example, one or more of respective layers 44-52, that define stepped window edges. For example, each respective layer of the plurality layers may define a respective window edge of a plurality of window edges, for example, as shown in FIG. 3A. The plurality of window edges may define optical window 20 configured to transmit light through optical filter 58 to or from light emitter or receiver 60. At least a first respective window edge of the plurality of edges may be stepped relative to at least a second respective window edge of the plurality of window edges. For example, the window edge of first absorbing layer 44 adjacent optical window 20 may be the first respective window edge stepped relative to the second respective edge, for example, the window edge of second absorbing layer 46 adjacent optical window 20. In some examples, the second respective window edge of the plurality of window edges may be stepped relative to at least a third respective window edge of the plurality of window edges. For example, the window edge of second absorbing layer 46 adjacent optical window 20 may be the second respective window edge stepped relative to the third respective edge, for example, the window edge of first color layer 48 adjacent optical window 20. In some examples, the edges of one of respective layers 44, 46, 48, 50, or 52 may be stepped inwards or outwards with respect to another of respective layers 44, 46, 48, 50, or 52.

In some examples, as shown in FIG. 3A, each respective window edge of a respective layer of the plurality of layers may be stepped relative to at least another respective window edge of another respective layer of the plurality of layers. For example, the window edge of first absorbing layer 44 is stepped relative to each window edge respectively defined by second absorbing layer 46, first color layer 48, second color layer 50, and third color layer 52. Similarly, the respective window edges of each of second absorbing layer 46, first color layer 48, second color layer 50, and third color layer 52 are stepped relative to the window edges defined by the other layers of multilayer stack 40. In some examples, the first respective window edge may be stepped radially inward relative to the second respective window edge. In some examples, the plurality of window edges may include a plurality of successively radially inward window edges. For example, as shown in FIG. 3A, layers 44, 46, 48, 50, and 52 define a series of successively inward window edges in a direction from layer 44 to layer 52. In some examples, the plurality of successively radially inward window edges may include a radially outermost stepped window edge adjacent optical filter 58 and a radially innermost stepped window edge away from optical filter 58. For example, first absorbing layer 44 may define a radially outermost stepped window edge, and third color layer 52 may define a radially innermost stepped window edge. While in the example shown in FIG. 3A, the respective edges of layers, for example, 52, 50, and 48, are staggered, in some examples, an edge of one layer may extend over the edge defined by another layer. For example, a first layer may extend over the edge defined by a second layer, and the first layer may generally conform to an edge region defined by the second layer. In some examples, a first layer may at least partially surround an edge of a second layer.

In some examples, each respective edge of the plurality of successively radially inward window edges may respectively define a circle, an ellipse, a polygon, or a predetermined continuous, discontinuous, or dithered curve. For example, each respective edge of the plurality of successively radially inward edges may define a respective curve substantially similar to a predetermined closed curve. In some examples, each respective window edge of the plurality of window edges may define a respective predetermined circle. In some examples, each respective edge of the plurality of successively radially inward window edges may define substantially a similar curve or shape. In some examples, one or more edges of the plurality of successively radially inward window edges may define different curves or shapes.

A first window edge that is stepped relative to a second window edge may defined a cascaded or staggered set of window edges, for example, window edges that are separated by at least a predetermined lateral displacement along a plane parallel to a respective plane occupied by a layer defining one of the window edges. In some examples, stepped window edges may be separated by a minimum lateral displacement of at least about 10 nm, 100 nm, 1 micrometer, 10 micrometers, or 100 micrometers, or 1 mm, or 2 mm, or 5 mm, or 10 mm. In some examples, stepped window edges may be separated by a lateral displacement of less than about 5 mm, or less than about 2 mm, or less than about 1 mm.

In some examples, a layer may define a window edge at a physical boundary of the layer, for example, a boundary within which no material of the layer is present. In some examples, a layer may define a window edge at an optical boundary of the layer, for example, a boundary where an optical property of the layer changes. In some examples, a change in the one or more of the amount of a pigment, amount of a dye, a refractive index, reflectance, scattering, absorbance, or other optical property may define a window edge of a layer. For example, while a layer may include material across a major surface of the layer, material surrounding the window edge may be black, while material within the window edge may be transparent. Thus in some examples, optical window 20 may be defined by a series of transparent, translucent, or even visibly opaque regions within respective window edges of respective layers of multilayer stack 40, such that optical window 20 transmits predetermined wavelengths. For example, optical window 20 may transmit all wavelengths, or transmit only infrared wavelengths while reflecting or scattering visible wavelengths. However, as described above, in some examples, layers of multilayer stack 40 may not occupy optical window 20, since no region of the layers may be present within respective window edges. In some examples, multilayer stack 40a may include a plurality of layers arranged from a lowermost layer to an uppermost layer, as shown in FIG. 3A. For example, third color layer 52 may be an uppermost layer, and first absorbing layer 44 may be a lowermost layer, and each respective upper layer in multilayer stack 40a may define a respective upper window edge that extends radially inward from a respective lower window edge defined by a respective lower layer of the plurality of layers.

Figure 3B:
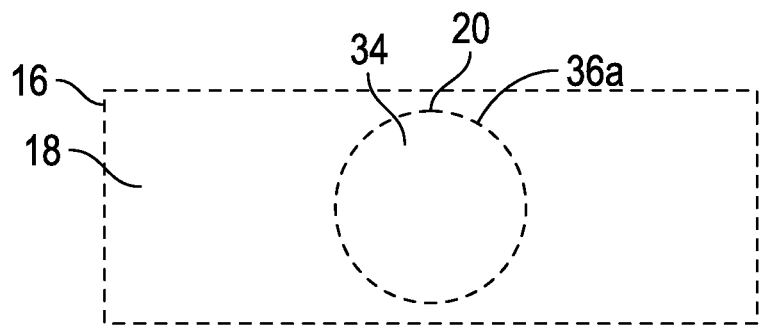
FIG. 3B is a top-view of the example optical window of FIG. 3A.

Thus in some examples, multilayer stack 40a of FIG. 3A may exhibit stepped, staggered, cascading, or displaced window edges, such that optical window 20 defined by the respective stepped edges has a graded edge 36a, as seen in FIG. 3B. FIG. 3B is a top-view of the example optical window of FIG. 3A. Graded edge 36a may be less perceptible compared to edge 36 of FIG. 2B. In some examples, graded edge 36a may be visually imperceptible, so that the perceptibility of optical window 20 may be reduced or eliminated.

Figure 4:
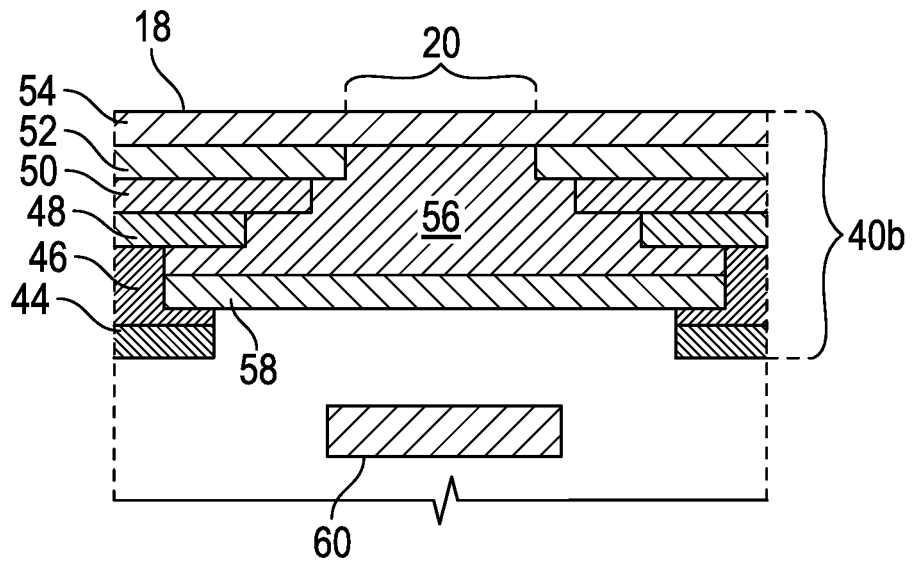
FIG. 4 is a cross-sectional diagram of an example article including an example optical window having stepped edges.

In some examples, optical filter 58 may be disposed between at least one layer of the plurality of layers and light emitter or receiver 60. For example, optical filter 58 may be disposed between any of layers 44, 46, 48, 50, and 52, or any other layer of multilayer stack 40, and light emitter or receiver 60. In some examples, optical filter 58 may be disposed between a lowermost layer of the plurality of layers and light emitter or receiver 60. For example, first absorbing layer 44 may be a lowermost layer, and optical filter 58 may be disposed between first absorbing layer 44 and light emitter or receiver 60, as shown in FIG. 3A. In some examples, the spatial extent of optical filter 58, and the spatial relation between the location of optical filter 58 and one or more layers of multilayer stack 40 may be varied. For example, optical filter 58 may be disposed between an uppermost layer of the plurality of layers and light emitter or receiver 60. FIG. 4 is a cross-sectional diagram of an example article including example optical window 20 having stepped edges. For example, as shown in FIG. 4, third color layer 52 may be an uppermost layer, and optical filter 58 may be positioned between first absorbing layer 44 and first color layer 48, thus being disposed between uppermost layer color layer 52 and light emitter or receiver 60. In some examples, at least a region of optical filter 58 may be disposed between optically clear adhesive 56 and second layer 46.

Figure 5:
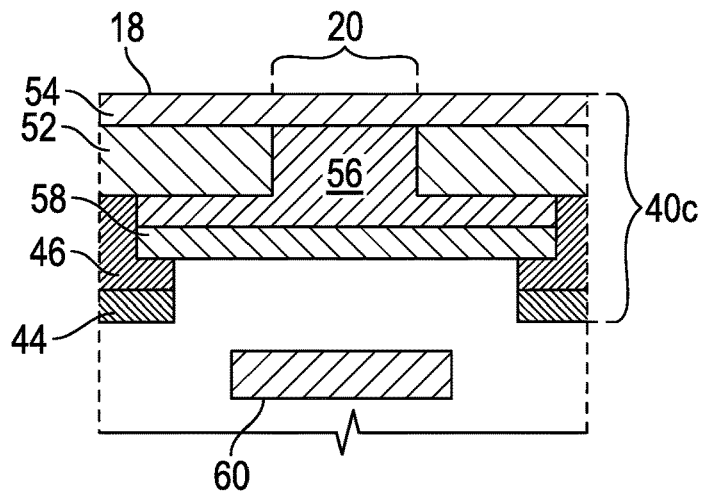
FIG. 5 is a cross-sectional diagram of an example article including an example optical window having stepped edges.

In some examples, multilayer stack 40 may include only a single color layer. For example, as shown in FIG. 5, a cross-sectional diagram of an example article including example optical window 20 having stepped edges, multilayer stack 40 may include third color layer 52, first absorbing layer 44, and second absorbing layer 46. Further, in the example article of FIG. 5, optical filter 58 may be disposed between an uppermost layer (layer 52) of the plurality of layers and light emitter or receiver 60.

Figure 6A:
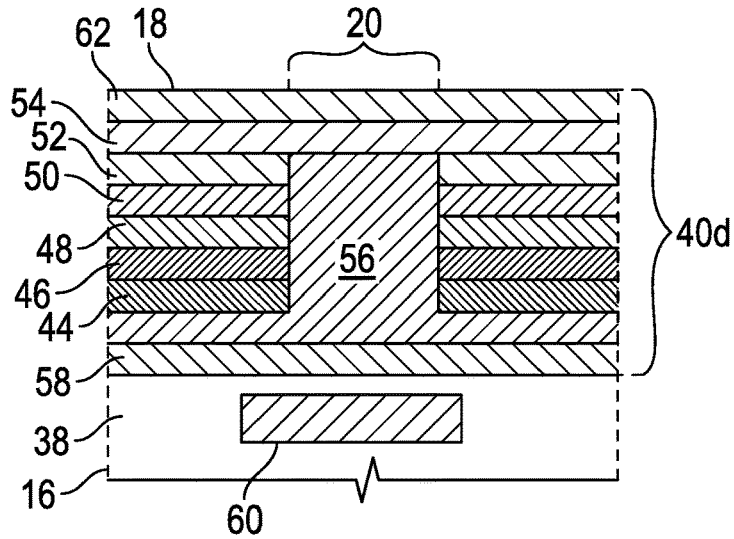
FIG. 6A is a cross-sectional diagram of an example article including an example optical window including a color layer extending across the window.

In some examples, example article 10 may include a color layer extending across optical window 20. For example, an additional color layer 62 extending across optical window 20 may be disposed on top of multilayer stack 40 of FIG. 2B that includes aligned window edges, to form a multilayer stack 40d, as shown in FIG. 6A. FIG. 6A is a cross-sectional diagram of an example article including color layer 62 extending across optical window 20. While in the example article of FIG. 6A, additional color layer 62 is disposed on top of protective layer 54, in some examples, protective layer 54 may be disposed on top of additional color layer 62, such that additional color layer 62 is disposed on an uppermost layer of multilayer stack 40. In some examples, color layer 62 extending across optical window 20 may be disposed on top of multilayer stack 40a that includes stepped window edges. Thus, in some examples, multilayer stack 40 of FIG. 2B, or multilayer stack 40a of FIG. 3A, may be disposed between color layer 62 and optical filter 58. In some examples, multilayer stacks 40 or 40a may include a color layer that extends across optical window 20. For example, one or more of color layers 48, 50, 52, or a different color layer of multilayer stacks 40 or 40a may extend across optical window 20.

Figure 6B:
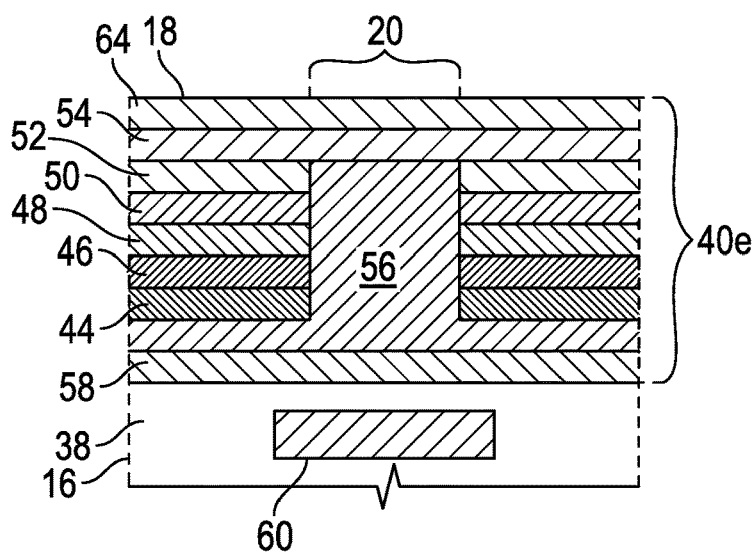
FIG. 6B is a cross-sectional diagram of an example article including an example optical window including a texture layer extending across the window.

In some examples, example article 10 may include a texture layer extending across optical window 20. For example, a texture layer 64 extending across optical window 20 may be disposed on top of multilayer stack 40 of FIG. 2B that includes aligned window edges, to form a multilayer stack 40e, as shown in FIG. 6B. FIG. 6B is a cross-sectional diagram of an example article including texture layer 64 extending across optical window 20. While in the example article of FIG. 6B, texture layer 64 is disposed on top of protective layer 54, in some examples, protective layer 54 may be disposed on top of texture layer 64, such that texture layer 64 is disposed on an uppermost layer of multilayer stack 40. In some examples, texture layer 64 extending across optical window 20 may be disposed on top of multilayer stack 40a that includes stepped window edges. Thus, in some examples, multilayer stack 40 of FIG. 2B, or multilayer stack 40a of FIG. 3A may be disposed between texture layer 64 and optical filter 58. In some examples, multilayer stacks 40 or 40a may include texture layer 64. For example, texture layer 64 may be disposed between an uppermost layer and a lowermost layer of multilayer stack 40 or 40a. Texture layer 64 may include a texture resulting from one or more of refraction, reflection, diffusion, diffraction or absorption.

Articles according to one or more examples described above may be prepared using example techniques described below. An example technique may include forming a respective window edge of a plurality of window edges in each respective layer of a plurality of layers. The example technique may include arranging the plurality of layers from a lowermost layer to an uppermost layer to form a multilayer stack. Each respective upper layer in the multilayer stack may define a respective upper window edge that extends radially inward from a respective lower window edge defined by a respective lower layer of the plurality of layers. The example technique may include disposing an optical filter adjacent the lowermost layer.

In some examples, disposing the optical filter adjacent the lowermost layer may include disposing the optical filter between the uppermost layer and the lowermost layer. In some examples, disposing the optical filter adjacent the lowermost layer may include disposing the lowermost layer between the uppermost layer and the optical filter. In some examples, at least the uppermost layer of the plurality of layers may substantially scatter visible light. In some examples, at least the lowermost layer of the plurality of layers may substantially absorb visible light. In some examples, at least the uppermost layer may include one or more of a white ink, pigment, or dye, and at least the lowermost layer may include one or more of a black ink, pigment, or dye. In some examples, the example technique may include disposing an optically clear adhesive to substantially occupy the optical window. In some examples, the example technique may include disposing a protective layer adjacent the uppermost layer. In some examples, the example technique may include disposing a color layer adjacent the uppermost layer. In some examples, the example technique may include disposing a texture layer adjacent the uppermost layer.

Thus, example systems, articles, and techniques according to the present disclosure may include example an optical window that may be substantially visually imperceptible through a major surface of the multilayer stack. For example, a view of optical filter 58 through optical window 20 may be visually imperceptible from a major surface of the multilayer stack, or from surface 18.

Example articles and techniques according to the disclosure provide will be illustrated by the following non-limiting embodiments and examples.

EMBODIMENTS

Embodiments of the invention include the following enumerated items:

Item 1. An article comprising:
an optical filter; and
a multilayer stack adjacent the optical filter, wherein the multilayer stack comprises a plurality of layers, each respective layer of the plurality layers defining a respective window edge of a plurality of window edges, wherein the plurality of window edges defines an optical window configured to transmit light through the optical filter, wherein at least a first respective window edge of the plurality of window edges is stepped relative to at least a second respective window edge of the plurality of window edges.

Item 2. The article of item 1, wherein the second respective window edge of the plurality of window edges is stepped relative to at least a third respective window edge of the plurality of window edges.

Item 3. The article of item 1 or 2, wherein the first respective window edge is stepped radially inward relative to the second respective window edge.

Item 4. The article of item 1, wherein the plurality of window edges comprises a plurality of successively radially inward window edges.

Item 5. The article of item 4, wherein the plurality of successively radially inward window edges comprises a radially outermost stepped window edge adjacent the optical filter and a radially innermost stepped window edge away from the optical filter.

Item 6. The article of item 4 or 5, wherein each respective edge of the plurality of successively radially inward window edges respectively defines a circle, an ellipse, a polygon, or a predetermined curve.

Item 7. The article of any one of items 4 to 6, wherein each respective edge of the plurality of successively radially inward edges defines a respective curve substantially similar to a predetermined closed curve.

Item 8. The article of any one of items 1 to 7, wherein each respective window edge of the plurality of window edges defines a respective predetermined circle.

Item 9. The article of any one of items 1 to 8, further comprising a protective layer adjacent a major surface of the multilayer stack, wherein the major surface is away from the optical filter.

Item 10. The article of any one of items 1 to 9, further comprising an optically clear adhesive substantially occupying the optical window.

Item 11. The article of any one of items 1 to 10, further comprising a light emitter or receiver, wherein the optical filter is disposed between at least one layer of the plurality of layers and the light emitter or receiver.

Item 12. The article of item 11, wherein the optical filter is disposed between an uppermost layer of the plurality of layers and the light emitter or receiver.

Item 13. The article of any of items 11 or 12, wherein the optical filter is disposed between a lowermost layer of the plurality of layers and the light emitter or receiver.

Item 14. The article of any one of items 1 to 13, wherein at least one layer of the plurality of layers substantially scatters visible light, and wherein at least another layer of the plurality of layers substantially absorbs visible light.

Item 15. The article of item 14, wherein the at least one layer comprises one or more of a white ink, pigment, or dye, and wherein the at least another layer comprises one or more of a black ink, pigment, or dye.

Item 16. The article of any one of items 1 to 15, further comprising a color layer, wherein the multilayer stack is disposed between the color layer and the optical filter, wherein the color layer extends across the optical window.

Item 17. The article of any one of items 1 to 15, further comprising a texture layer, wherein the multilayer stack is disposed between the texture layer and the optical filter, wherein the texture layer extends across the optical window.

Item 18. An article comprising:
an optical filter; and
a multilayer stack comprising a plurality of layers arranged from a lowermost layer to an uppermost layer, wherein each respective upper layer in the multilayer stack defines a respective upper window edge that extends radially inward from a respective lower window edge defined by a respective lower layer of the plurality of layers.

Item 19. The article of item 18, wherein at least the uppermost layer of the plurality of layers substantially scatters visible light, and wherein at least the lowermost layer of the plurality of layers substantially absorbs visible light.

Item 20. The article of item 19, wherein at least the uppermost layer comprises one or more of a white ink, pigment, or dye, and wherein at least the lowermost layer comprises one or more of a black ink, pigment, or dye.

Item 21. An article comprising:
an optical filter;
a multilayer stack adjacent the optical filter, wherein the multilayer stack comprises a plurality of layers, each respective layer of the plurality layers defining a respective window edge of a plurality of window edges, wherein the plurality of window edges defines an optical window configured to transmit light through the optical filter; and a color layer, wherein the multilayer stack is disposed between the color layer and the optical filter, wherein the color layer extends across the optical window.

Item 22. An article comprising:
an optical filter;
a multilayer stack adjacent the optical filter, wherein the multilayer stack comprises a plurality of layers, each respective layer of the plurality layers defining a respective window edge of a plurality of window edges, wherein the plurality of window edges defines an optical window configured to transmit light through the optical filter; and a texture layer, wherein the multilayer stack is disposed between the texture layer and the optical filter, wherein the texture layer extends across the optical window.

Item 23. The article of any one of items 1 to 22, wherein the light emitter or receiver comprises one or more of a proximity sensor, an infrared light emitting diode, an infrared source, an infrared sensor, a camera, or an ambient light sensor.

Item 24. The article of any one of items 1 to 23, wherein the optical filter comprises a wavelength selective scattering filter having a predetermined infrared transmittance and a predetermined visible scattering ratio, wherein the optical filter is configured to camouflage the light emitter or receiver.

Item 25. The article of any one of items 1 to 24, wherein the optical window is substantially visually imperceptible through a major surface of the multilayer stack.

Item 26. The article of any one of items 1 to 24, wherein a view of the optical filter through the optical window is visually imperceptible from a major surface of the multilayer stack.

Item 27. A portable electronic device comprising the article of any one of items 1 to 26.

Item 28. The portable electronic device of item 27, further comprising a display adjacent the optical window.

Item 29. A method comprising:
forming a respective window edge of a plurality of window edges in each respective layer of a plurality of layers;
arranging the plurality of layers from a lowermost layer to an uppermost layer to form a multilayer stack, wherein each respective upper layer in the multilayer stack defines a respective upper window edge that extends radially inward from a respective lower window edge defined by a respective lower layer of the plurality of layers; and disposing an optical filter adjacent the lowermost layer.

Item 30. The method of item 29, wherein disposing the optical filter adjacent the lowermost layer comprises disposing the optical filter between the uppermost layer and the lowermost layer.

Item 31. The method of item 29, wherein disposing the optical filter adjacent the lowermost layer comprises disposing the lowermost layer between the uppermost layer and the optical filter.

Item 32. The method of any one of items 29 to 31, wherein at least the uppermost layer of the plurality of layers substantially scatters visible light, and wherein at least the lowermost layer of the plurality of layers substantially absorbs visible light.

Item 33. The method of item 32, wherein at least the uppermost layer comprises one or more of a white ink, pigment, or dye, and wherein at least the lowermost layer comprises one or more of a black ink, pigment, or dye.

Item 34. The method of any one of items 31 to 33, further comprising disposing an optically clear adhesive to substantially occupy the optical window.

Item 35. The method of any one of items 31 to 34, further comprising disposing a protective layer adjacent the uppermost layer.

Item 36. The method of any one of items 31 to 35, further comprising disposing a color layer adjacent the uppermost layer.

Item 37. The method of any one of items 31 to 36, further comprising disposing a texture layer adjacent the uppermost layer.

EXAMPLES

Example 1

Figure 7A:
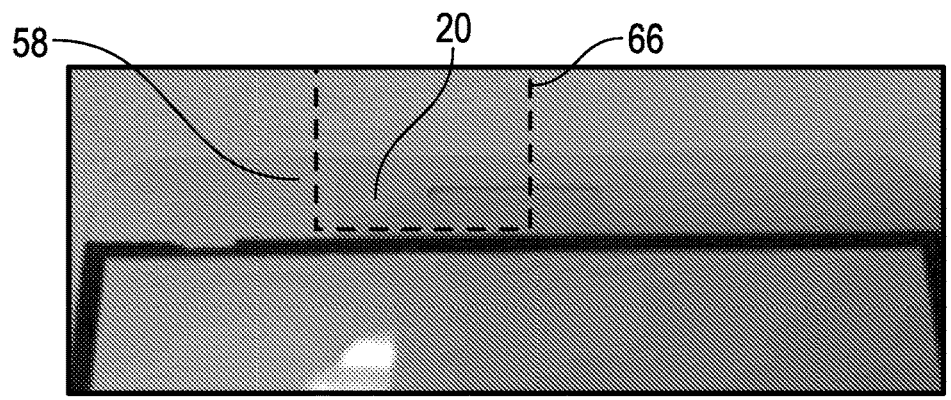
FIG. 7A is a photograph of an example device including an example optical window.
Figure 7B:
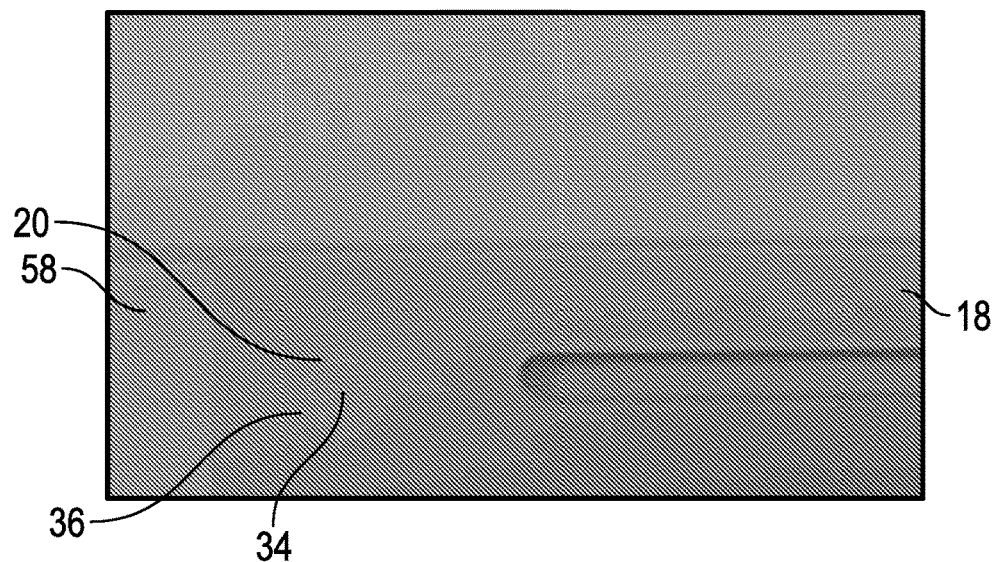
FIG. 7B is an enlarged view of a region of the photograph of FIG. 7A.

The appearance of an optical window of an electronic device covering an optical filter was evaluated. FIG. 7A is a photograph of a display panel of an example device including optical window 20 over optical filter 58. FIG. 7B is an enlarged view of region 66 of the photograph of FIG. 7A. View 34 of optical filter 58 is visible through optical window 20. As seen in FIG. 7B, the appearance of view 34 is visibly distinguishable from the appearance of surface 18 surrounding optical window 20. For example, optical window 20 exhibits edge 36 that is visible.

Example 2

Figure 8:
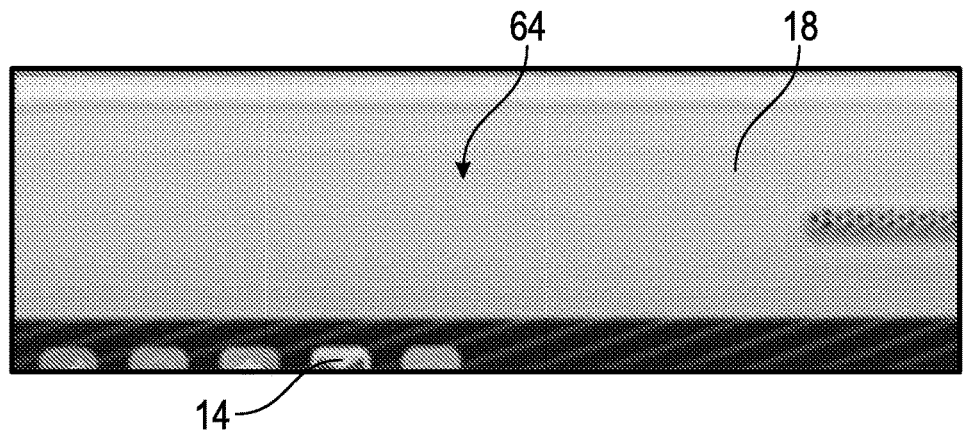
FIG. 8 is a photograph of an example device including an example optical window having a texture layer extending across the window.

The appearance of an optical window of an electronic device covered by a texture layer was evaluated. FIG. 8 is a photograph of an example device including an optical window covered by texture layer 64 extending across surface 18, and across the optical window (not seen). Texture layer 64 is disposed adjacent display 14. As seen in FIG. 8, texture layer 64 camouflaged the optical window from visible perception.

Example 3

The optical properties of a sample film including an optical filter was compared with sample films including an optical filter covered by example multilayer stacks. In particular, a wavelength selective near infrared transmissive visible scattering optical filter (sample S1) was covered by one, two, three, four, and five white layers (samples S2-S6), and the wavelength selective near infrared transmissive visible scattering optical filter was covered with a black layer covered by five white layers (sample S7). The L, a, b color values and visible reflectance of the samples was measured. The results are presented in TABLE 1.

TABLE 1

| Sample Number | L* | a* | B* |
|---|---|---|---|
| S1 | 98.1796 | −1.6335 | −1.1845 |
| S2 | 96.6844 | −2.6475 | 2.2417 |
| S3 | 96.0052 | −2.8895 | 4.1248 |
| S4 | 95.5049 | −3.1609 | 5.6633 |
| S5 | 95.3037 | −3.385 | 6.8297 |
| S6 | 94.8865 | −3.6261 | 7.9789 |
| S7 | 86.2611 | −2.6244 | 1.6564 |

Figure 9A:
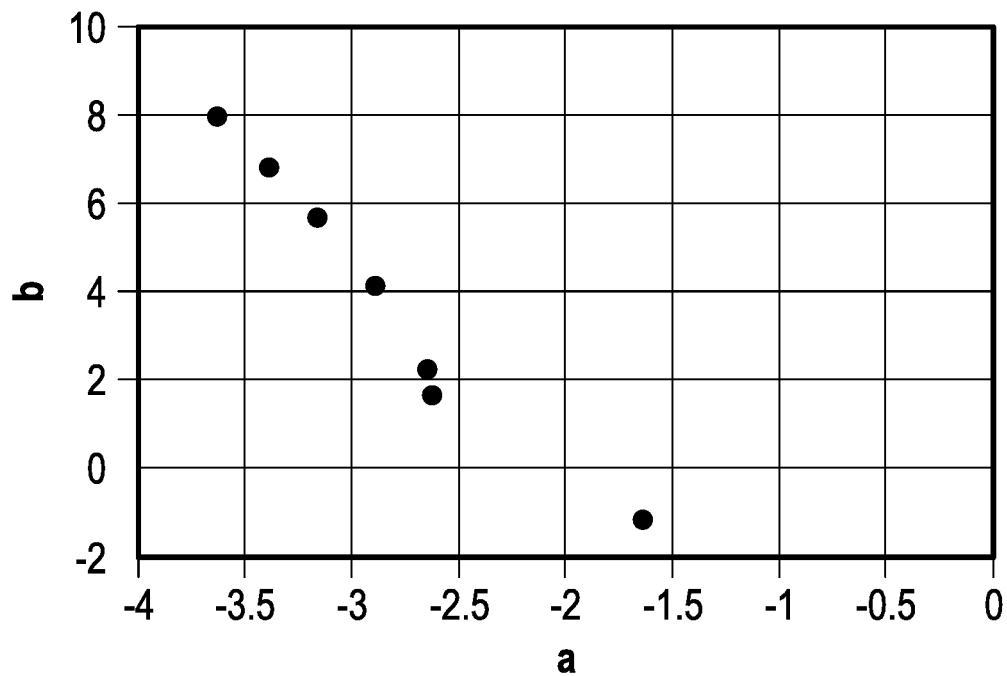
FIGS. 9A and 9B are charts presenting color LAB values ($L^*$, $a^*$, and $b^*$) of example multilayer optical films measured using a colorimeter.
Figure 9B:
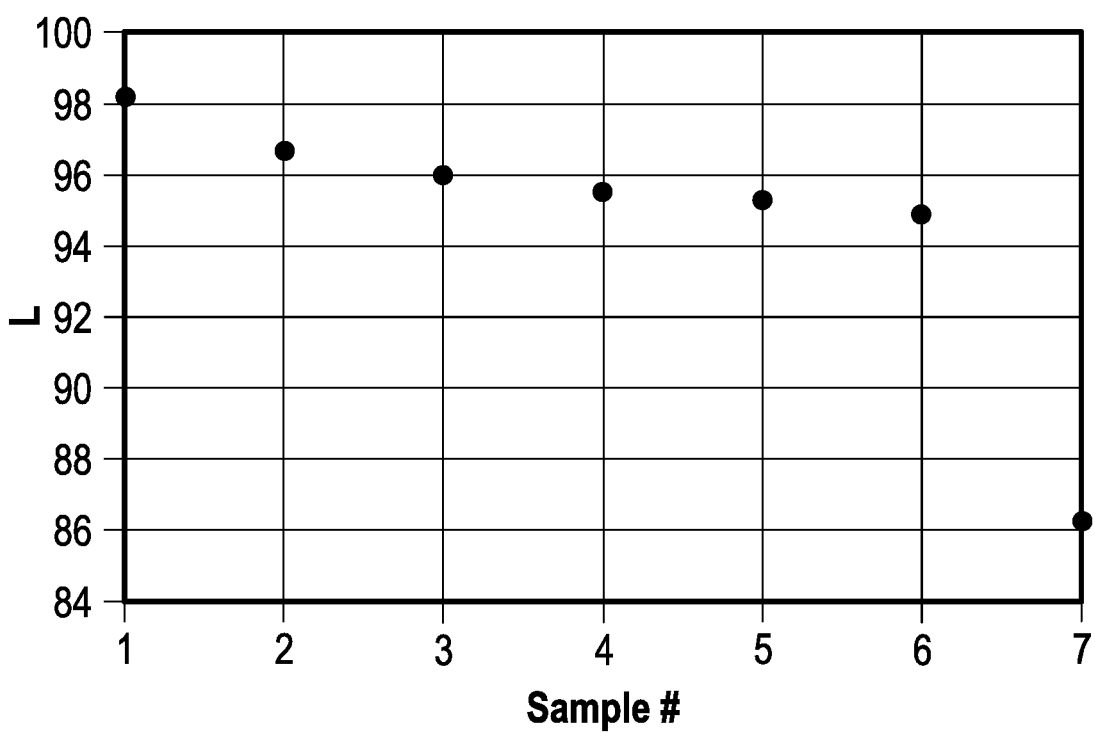
Figure 9C:
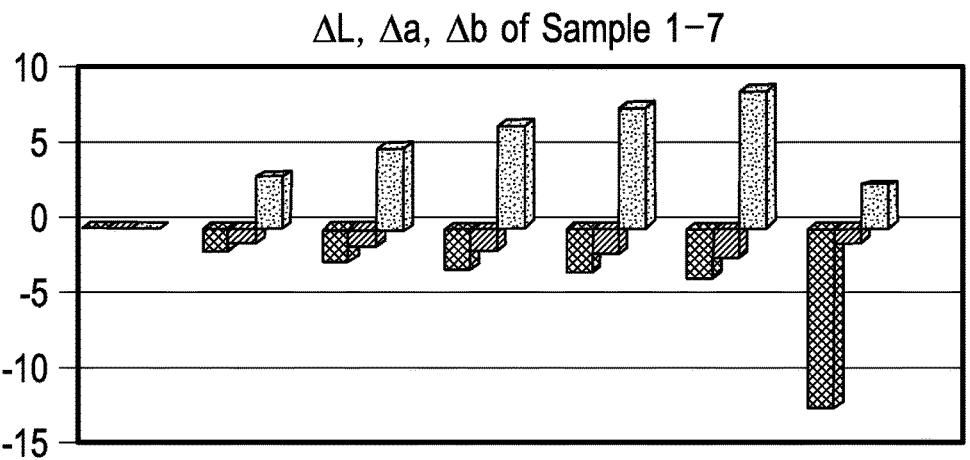
FIG. 9C is a chart presenting $\Delta L$, $\Delta a$, and $\Delta b$ values of example multilayer optical films of FIGS. 9A and 9B relative to an optical filter.
Figure 9D:
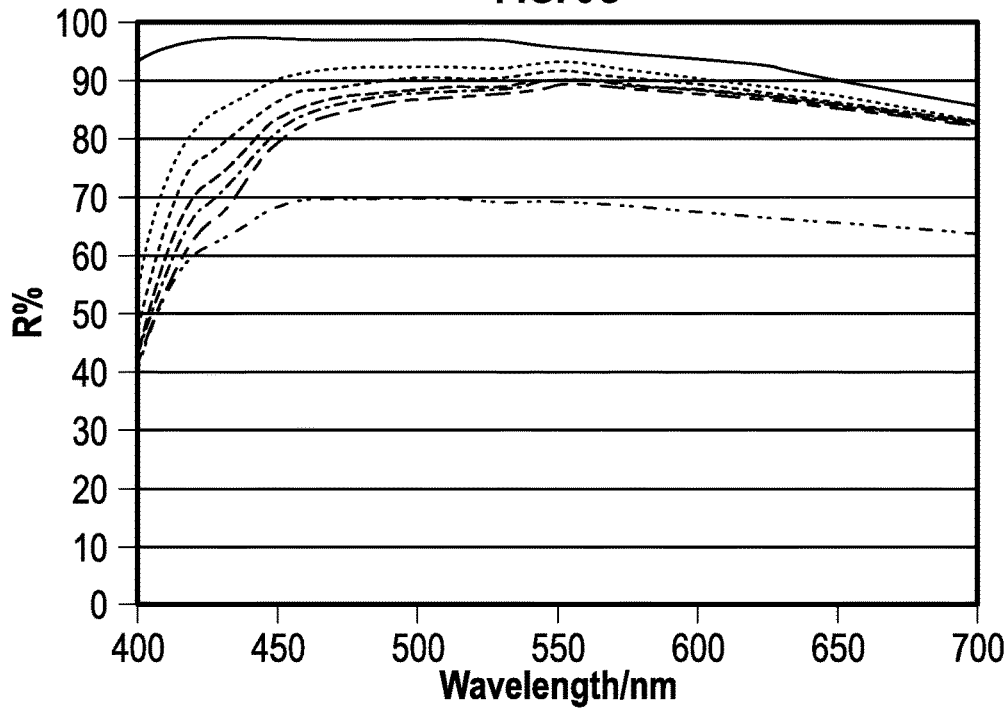
FIG. 9D is a chart present visible reflectance of the example optical multilayer stacks of FIGS. 9A and 9B.

FIGS. 9A and 9B are charts presenting color LAB values (L*, a*, and b*) of sample films S1 to S7 of TABLE 1. FIG. 9C is a chart presenting ΔL, Δa, and Δb values of example multilayer optical films of FIGS. 9A and 9B relative to an optical filter. As seen in FIGS. 9A-9C, L*, a*, and b* values continued to increasingly deviate from those of the optical filter, as the number of white layers in the stack was increased from one to five. Further, the addition of the black layer significantly reduced the deviation in a*, and b* values, and significantly increased the deviation in the L* value, indicating that the black layer generally reduced the scattering intensity. FIG. 9D is a chart present visible reflectance of samples S1 to S7 of FIGS. 9A and 9B, from the top curve to the bottom curve. The visible reflectance decreased as the number of white layers was increased, and significantly decreased when a black layer was included in addition to the white layers.

Example 4

Figure 10A:
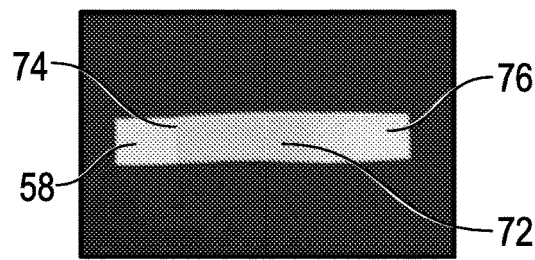
FIG. 10A is a photograph of an example optical multilayer having a first stepped edge and a second sharp edge.
Figure 10B:
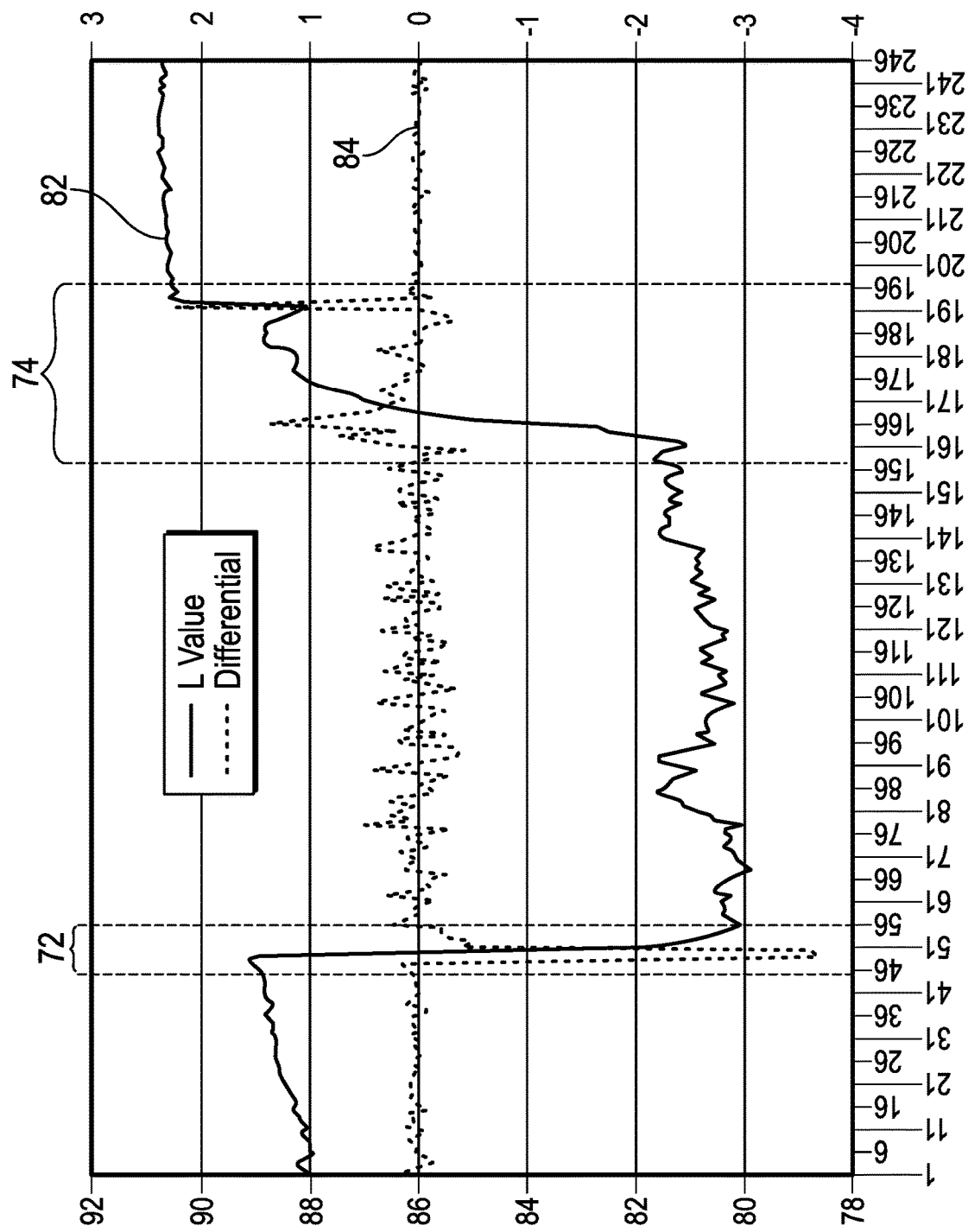
FIG. 10B is a chart presenting a first curve representing the linear variation of color L values of the example optical multilayer film of FIG. 10A from the sharp edge to the stepped edge, and a differential curve of the first curve.

FIG. 10A is a photograph of an example multilayer stack 72 having a first stepped edge 76 and a second sharp edge 74. Wavelength selective optical filter 58 was disposed under multilayer stack 72. Optical filter FIG. 10B is a chart presenting a first curve 82 representing the linear variation of color L values of the example optical multilayer film of FIG. 10A from sharp edge 74 to stepped edge 76, and a differential curve 84 of the first curve. As seen in FIGS. 10A and 10B, the sharp edge 74 exhibited a sharp gradient, resulting in a visibly pronounced edge, while the stepped edge 76 exhibited a smoother gradient, resulting in attenuation of the visibility of the edge.

Various examples of the invention have been described. These and other examples are within the scope of the following claims.

The invention claimed is:

1. An article comprising:
   a near infrared transmissive visible scattering optical filter;
   a multilayer stack adjacent the optical filter, wherein the multilayer stack comprises a plurality of layers, each respective layer of the plurality of layers defining a respective window edge of a plurality of window edges, wherein the plurality of window edges defines an optical window configured to transmit light through the optical filter, the optical filter extending across the optical window, wherein at least a first respective window edge of the plurality of window edges is stepped relative to at least a second respective window edge of the plurality of window edges; and
   a texture layer, wherein the multilayer stack is disposed between the texture layer and the optical filter, wherein the texture layer extends across the optical window.

2. The article of claim 1, wherein the second respective window edge of the plurality of window edges is stepped relative to at least a third respective window edge of the plurality of window edges.

3. The article of claim 1, wherein the first respective window edge is stepped radially inward relative to the second respective window edge.

4. The article of claim 1, wherein the plurality of window edges comprises a plurality of successively radially inward window edges.

5. The article of claim 4, wherein the plurality of successively radially inward window edges comprises a radially outermost stepped window edge adjacent the optical filter and a radially innermost stepped window edge away from the optical filter.

6. The article of claim 4, wherein each respective edge of the plurality of successively radially inward window edges respectively defines a circle, an ellipse, a polygon, or a predetermined curve.

7. The article of claim 4, wherein each respective edge of the plurality of successively radially inward edges defines a respective curve substantially similar to a predetermined closed curve.

8. The article of claim 1, wherein each respective window edge of the plurality of window edges defines a respective predetermined circle.

9. The article of claim 1, further comprising a protective layer adjacent a major surface of the multilayer stack, wherein the major surface is away from the optical filter.

10. The article of claim 1, wherein an optically clear adhesive extends between window edges of a layer of the multilayer stack.

11. The article of claim 10, wherein the optically clear adhesive extends between window edges of at least two layers of the multilayer stack.

12. The article of claim 10, wherein the optically clear adhesive extends between window edges of at least two layers of the multilayer stack, a distance between the window edges of a first of the two layers being different from a distance between the window edges of a second of the two layers.

13. The article of claim 1, further comprising a light emitter or receiver, wherein the optical filter is disposed between at least one layer of the plurality of layers and the light emitter or receiver.

14. The article of claim 13, wherein the optical filter is disposed between an uppermost layer of the plurality of layers and the light emitter or receiver.

15. The article of claim 1, wherein at least one layer of the plurality of layers substantially scatters visible light, and wherein at least another layer of the plurality of layers substantially absorbs visible light.

16. The article of claim 1, wherein the at least one layer comprises one or more of a white ink, pigment, or dye, and wherein the at least another layer comprises one or more of a black ink, pigment, or dye.

17. The article of claim 1, further comprising a color layer, wherein the multilayer stack is disposed between the color layer and the optical filter, wherein the color layer extends across the optical window.

18. The article of claim 1, wherein the near infrared transmissive visible scattering optical filter includes at least one white layer.

19. The article of claim 1, wherein the near infrared transmissive visible scattering optical filter includes a plurality of white layers.

20. The article of claim 1, wherein the near infrared transmissive visible scattering optical filter includes a black layer.

21. The article of claim 1, wherein the near infrared transmissive visible scattering optical filter includes a black layer and at least one white layer.

22. An article comprising:
a near infrared transmissive visible scattering optical filter; and
a multilayer stack comprising a plurality of layers arranged from a lowermost layer to an uppermost layer, wherein each respective upper layer in the multilayer stack defines a respective upper window edge that extends radially inward from a respective lower window edge defined by a respective lower layer of the plurality of layers;
wherein the plurality of layers comprises a color layer defining at least one window edge, and wherein portions of the color layer on opposite sides of the at least one window edge defined by the color layer are discontinuous from one another;
wherein at least the uppermost layer of the plurality of layers substantially scatters visible light, and wherein at least the lowermost layer of the plurality of layers substantially absorbs visible light, wherein an optically clear adhesive extends between window edges of a layer of the multilayer stack, and wherein the optical filter extends across an optical window defined by the window edges of the multilayer stack.

23. The article of claim 22, wherein at least the uppermost layer comprises one or more of a white ink, pigment, or dye, and wherein at least the lowermost layer comprises one or more of a black ink, pigment, or dye.

24. An article comprising:
a near infrared transmissive visible scattering optical filter;
a multilayer stack adjacent the optical filter, wherein the multilayer stack comprises a plurality of layers, each respective layer of the plurality of layers defining a respective window edge of a plurality of window edges, wherein the plurality of window edges defines an optical window configured to transmit light through the optical filter, the optical filter extending across the optical window;
a protective layer; and
a color layer, wherein the multilayer stack is disposed between the color layer and the optical filter, wherein the color layer extends across the optical window.

* * * * *